United States Patent
Kumaresan et al.

(10) Patent No.: US 10,437,654 B2
(45) Date of Patent: Oct. 8, 2019

(54) CONTEXT-AWARE APPLICATION PROGRAMMING INTERFACE RESPONSE MANAGEMENT

(71) Applicant: Accenture Global Solutions Limited, Dublin (IE)

(72) Inventors: Senthil Kumar Kumaresan, Bangalore (IN); Nataraj Kuntagod, Bangalore (IN); Satya Sai Srinivas Abbabathula, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 57 days.

(21) Appl. No.: 15/493,655

(22) Filed: Apr. 21, 2017

(65) Prior Publication Data

US 2017/0329657 A1    Nov. 16, 2017

(30) Foreign Application Priority Data

May 12, 2016 (IN) .............................. 201641016597

(51) Int. Cl.
*G06F 3/00* (2006.01)
*G06F 9/54* (2006.01)
*G06F 16/955* (2019.01)

(52) U.S. Cl.
CPC .............. *G06F 9/546* (2013.01); *G06F 9/541* (2013.01); *G06F 16/955* (2019.01)

(58) Field of Classification Search
CPC ......................... G06F 9/546; G06F 17/30876
See application file for complete search history.

(56) References Cited

U.S. PATENT DOCUMENTS 7,614,007 B2    11/2009  Brew et al.
8,271,996 B1 *   9/2012  Gould ..................... G06F 9/542
                                                        719/312
(Continued)

FOREIGN PATENT DOCUMENTS

WO    WO 2000/057339       9/2000

OTHER PUBLICATIONS

C. Mannweiler et al. "Context-Aware Smart Environments Enabling New Business Models and Services" 2010 ITU-T Kaleidoscope Academic Conference, pp. 1-7 (Year: 2010).*

(Continued)

*Primary Examiner* — Timothy A Mudrick
*Assistant Examiner* — Abdou K Seye
(74) *Attorney, Agent, or Firm* — Harrity & Harrity, LLP (57) ABSTRACT

A device may receive, from a consumer device, an application programming interface (API) request that includes information associated with a consumer of data and information associated with a producer of the data. The data may be collected by one or more data sources associated with the producer. The device may identify a consumer context, associated with the consumer, based on the information associated with the consumer. The device may identify a producer context, associated with the producer, based on the information associated with the producer. The device may generate an API response based on the consumer context and the producer context. The API response may include data in accordance with the consumer context and the producer context. The device may provide, to the consumer device, the API response to permit the consumer to view or access the data.

20 Claims, 5 Drawing Sheets

(56) References Cited

U.S. PATENT DOCUMENTS

| | | |
|---|---|---|
| 2012/0311672 A1 | 12/2012 | Connor et al. |
| 2013/0254401 A1 | 9/2013 | Marshall et al. |
| 2014/0180790 A1* | 6/2014 | Boal .................. G06Q 30/0245 705/14.42 |
| 2014/0180808 A1* | 6/2014 | Boal .................. G06Q 30/0245 705/14.53 |
| 2015/0058950 A1 | 2/2015 | Miu |
| 2016/0019666 A1* | 1/2016 | Amarasingham ...... G06Q 50/24 705/3 |
| 2016/0071341 A1 | 5/2016 | Menzel |

OTHER PUBLICATIONS

API Management, "Masgery API Management the complete SaaS-based API Management solution deployed any way you want it: in the cloud, on-premise or hybrid", 2016, 5 pages.

Intelligent API Management Apigee, "Intelligent API Management", Apigee Corp., 2016, 5 pages.

* cited by examiner

CONTEXT-AWARE APPLICATION PROGRAMMING INTERFACE RESPONSE MANAGEMENT

RELATED APPLICATION

This application claims priority under 35 U.S.C. § 119 to Indian Patent Application No. 201641016597, filed on May 12, 2016, the content of which is incorporated by reference herein in its entirety.

BACKGROUND

An application programming interface (API) allows for communication between different software systems. The API may hide intricacies and/or details of a system that receives an API request from a system that sent the API request, thereby allowing these systems to be independently managed, developed, upgraded, or the like, without sacrificing the ability to pass information via the API.

SUMMARY

According to some possible implementations, a device may include one or more processors to: receive, from a consumer device, an application programming interface (API) request, where the API request may include information associated with a consumer of data and information associated with a producer of the data, where the data may be collected by one or more data sources associated with the producer; identify a consumer context, associated with the consumer, based on the information associated with the consumer; identify a producer context, associated with the producer, based on the information associated with the producer; generate an API response based on the consumer context and the producer context, where the API response may include data in accordance with the consumer context and the producer context; and provide, to the consumer device, the API response to permit the consumer to view or access the data.

According to some possible implementations, a non-transitory computer-readable medium may store one or more instructions that, when executed by one or more processors, cause the one or more processors to: receive, from a consumer device, an application programming interface (API) request that includes information associated with a consumer of data and information associated with a producer of the data, where the data may be collected by one or more data sources associated with the producer; identify, based on the information associated with the consumer, a consumer context associated with the consumer; identify, based on the information associated with the producer, a producer context associated with the producer; determine a set of context rules based on the consumer context or the producer context; generate an API response based on the set of context rules, where the API response may include data in accordance with the set of context rules; and provide the API response to the consumer device to permit the consumer to view the data included in the API response.

According to some possible implementations, a method may include: receiving, by a management platform, a request that includes information that identifies a consumer of data and information that identifies a producer of the data, where the data may be collected by a set of sensors and being accessible by the management platform, and where the request may be provided by a consumer device associated with the consumer; identifying, by the device and based on the information that identifies the producer, a producer context associated with the producer; generating, by the device, a response to the request, where the response may be generated based on the producer context, and where the response may include data in accordance with the producer context; and providing, by the device and to the consumer device, the response, the response being provided to permit the consumer to view or access the data included in the response.

DETAILED DESCRIPTION

The following detailed description of example implementations refers to the accompanying drawings. The same reference numbers in different drawings may identify the same or similar elements.

A management platform (e.g., a server or group of servers, a cloud based platform, or the like) may be configured to receive and store data provided by one or more data sources (e.g., one or more sensors, one or more machine-to-machine (M2M) devices, one or more servers, or the like). The management platform may be configured with one or more APIs that expose the data, stored by the management platform, such that another device (e.g., a consumer device) may access the data. For example, the consumer device may send, to the management platform, an API request, associated with a particular API of the one or more APIs configured on the management platform, and the management platform may provide, to the consumer device, an API response, associated with the particular API, that includes data in accordance with the API request.

As data processing and/or storage capabilities of the management platform and/or capabilities of networks via which the data may be transferred (e.g., from the data sources to the management platform, from the management platform to consumer devices) improve, the ability of the management platform to receive, store, process, and provide data is also improved. This allows data sources with improved capabilities to be implemented for collection of data. For example, as data processing and/or storage capabilities increase, data sources capable of providing additional data (e.g., different types of data, more data of a particular type), data with higher (i.e., finer) granularity, higher precision data, or capable of providing data on a more frequent basis, may be implemented for the collection of data. As such, the management platform may store or have access to a vast amount of data that may be accessed by consumer devices.

However, the additional, high precision, and/or highly granular data may not be needed in all cases. For example, in a healthcare use case, a nurse (i.e., a first consumer) may need heart monitoring data of a first granularity (e.g., 100 samples per second (sps)), while a specialist (i.e., a second consumer) may need heart monitoring data of a second granularity (e.g., 500 sps). In other words, the data may need to be filtered before being provided to the consumer device in order to ensure that the consumer device receives the desired data and/or does not receive unwanted and/or extraneous data.

In some cases, the management platform may implement a parameterized API based approach in order to implement such filtering. Under this approach, an API configured on the management platform may be associated with multiple parameters. Here, a consumer device requests data by providing, to the API, an API request that includes information associated with the multiple parameters. For example, in the healthcare use case, the API request may include information that identifies a time window associated with the desired heart monitoring data, a sample rate associated with the desired heart monitoring data, or the like. As such, the API request needs to include the proper parameter information in order to ensure that the consumer device will be provided with the desired data. Thus, under the parameterized API based approach, API orchestration is pushed to the consumer-side (e.g., since the burden is placed on the consumer devices to provide API requests that include the proper parameter information). Here, errors, mistakes, omissions, or the like, arising on the consumer-side may cause incorrect and/or undesired data to be provided to the consumer devices.

Implementations described herein may provide a context-aware API response management platform capable of receiving an API request, identifying a consumer context and a producer context based on the API request, and generating an API response based on the consumer context and the producer context. In this way, the burden of API orchestration may lie on the server-side (e.g., rather than the consumer-side), thereby reducing a likelihood of incorrect and/or undesired data being provided to the consumer device. Moreover, the context-aware API response management platform may conserve computing resources (e.g., processing resources, memory resources) and/or network resources needed to provide desired data to the consumer device by, for example, reducing a number of API requests and responses that need to be generated, transferred, and/or processed (e.g., due to incorrectly generated API requests).

In some implementations, the context-aware API response management platform may be capable of generating a consumer prediction, associated with a consumer of the data to be provided based on the API request, and/or a producer prediction, associated with a producer of the data to be provided based on the API request, and generating the API response based on the consumer prediction and/or the producer prediction (e.g., in addition to the consumer context and the producer context). This may allow for further conservation of resources, as such predictions may allow the management platform to provide data to the consumer device without a need for the consumer device to provide an API request to the management platform and/or may anticipate data that may be requested at a future time.

Figure 1A:
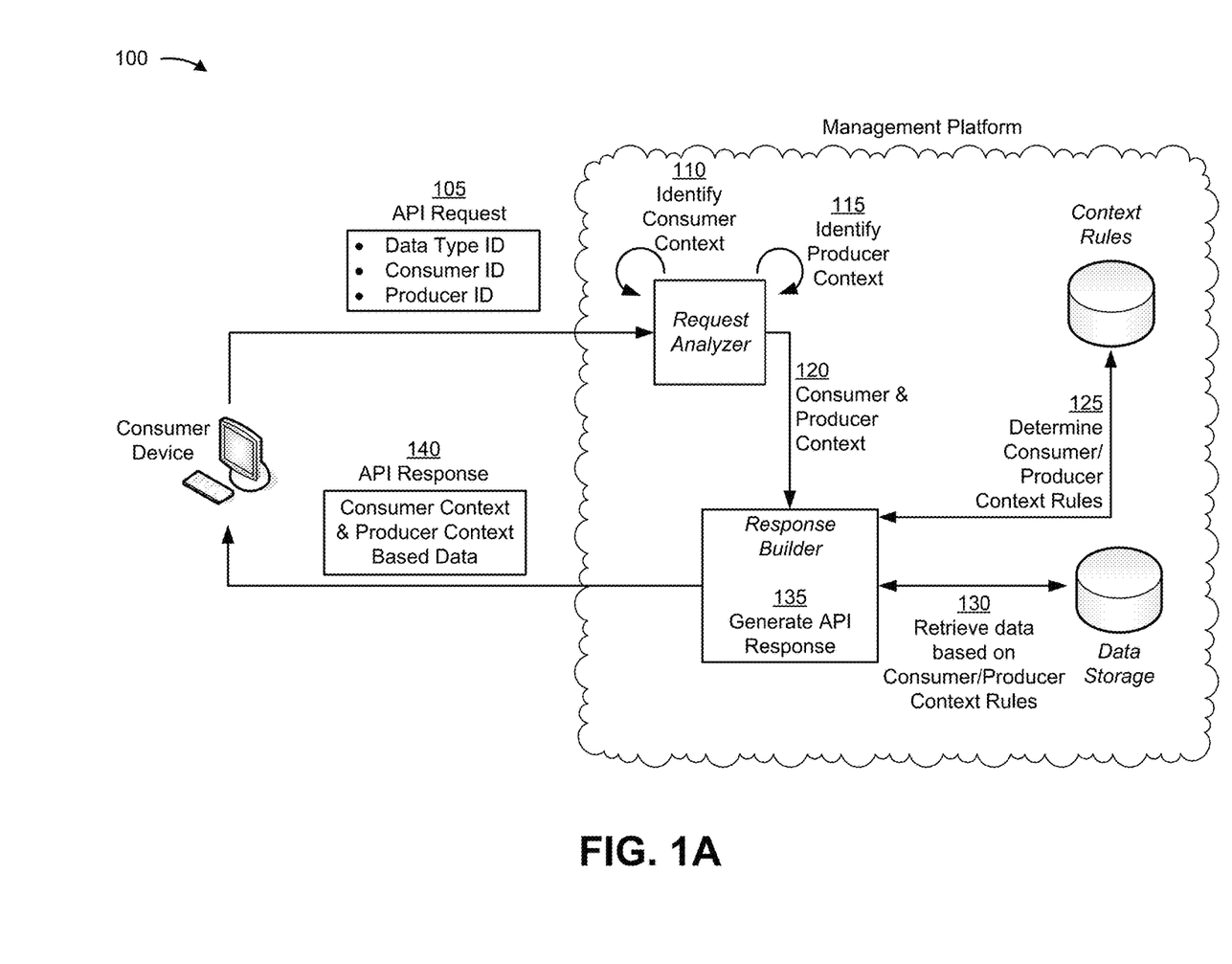
FIGS. 1A and 1B are diagrams of an overview of an example implementation described herein.
Figure 1B:
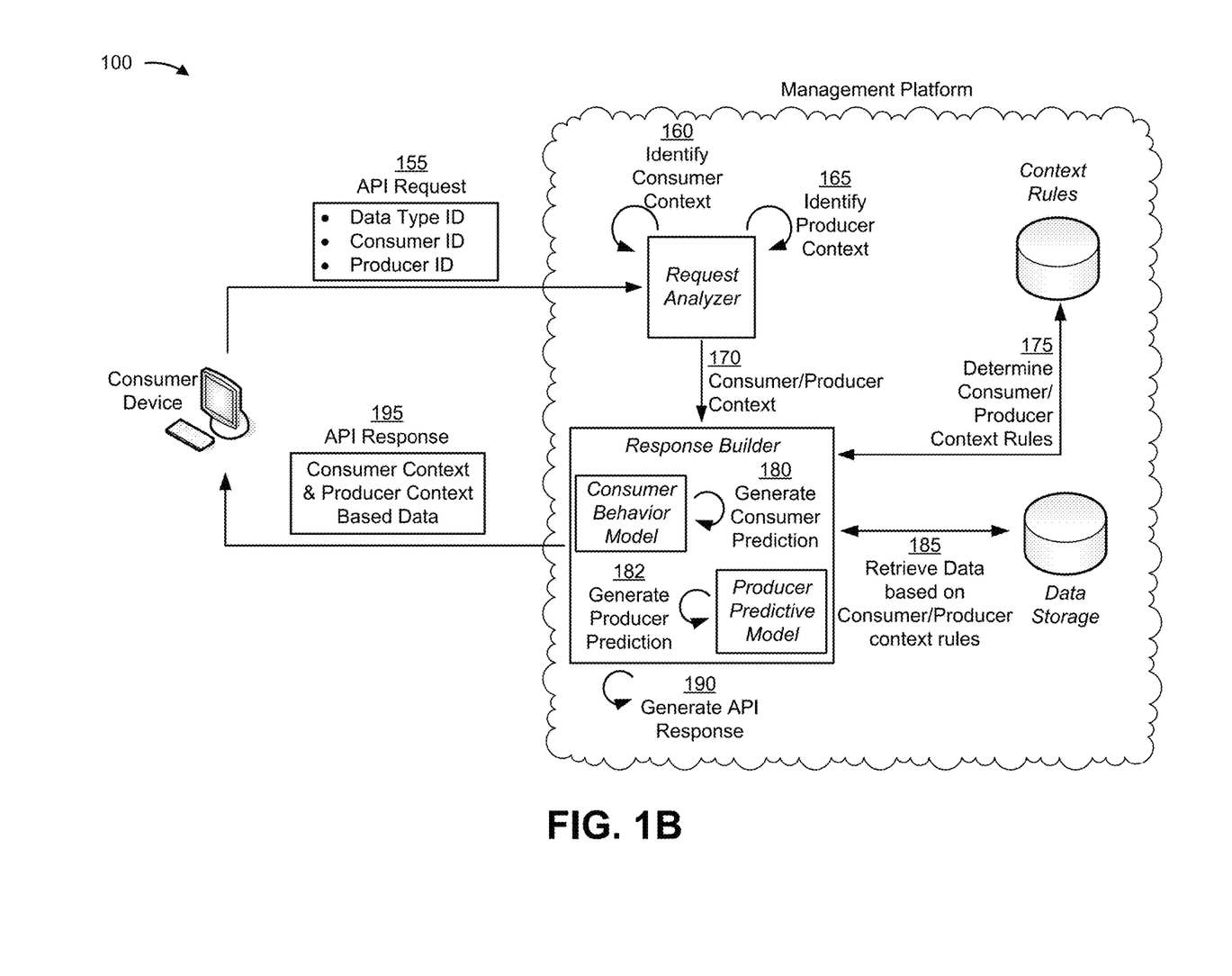

FIGS. 1A and 1B are diagrams of an overview of an example implementation 100 described herein. As shown in FIG. 1A, a management platform may include a request analyzer component capable of identifying a consumer context and/or a producer context associated with an API request provided by a consumer device. As further shown, the management platform may include a response builder component capable of generating an API response based on the consumer context and/or the producer context. As further shown, the management platform may also include one or more storage components capable of storing and/or accessing context rules and/or data provided by a group of data sources (not shown).

As shown in FIG. 1A, and by reference number 105, the consumer device may provide an API request to the management platform (e.g., the request analyzer component). As shown, the API request may include information that identifies a type of data associated with the API request, information associated with a consumer (e.g., a user that wishes to view or access the data), and information associated with a producer (e.g., a person, a device, an entity, a "thing" in the Internet of Things (IoT)) that is associated with the data that is to be provided based on the API request.

As shown by reference number 110, the request analyzer may identify, based on the information associated with the consumer, a consumer context associated with the API request. The consumer context may include information that identifies a circumstance, a condition, a factor, a background, or the like, associated with the consumer, that may be used as a basis on which to generate the API response.

As shown by reference number 115, the request analyzer may also identify, based on the information associated with the producer, a producer context associated with the API request. The producer context may include information that identifies a type, a group, a class, a condition, a factor, a background, or the like, associated with the producer, that may be used as a basis on which to generate the API response.

As shown by reference number 120, the request analyzer may provide information associated with the consumer context and information associated with the producer context to the response builder of the management platform. As shown by reference number 125, the response builder may determine (e.g., by communicating with a storage component that stores context rules) one or more context rules based on the consumer context and/or the producer context. A context rule may include a rule, corresponding to the consumer context and/or the producer context, that indicates an amount of data to be included in the API response, a precision of the data to be included in the API response, a granularity of the data to be included in the API response, or the like.

As shown by reference number 130, the response builder may retrieve (e.g., by communicating with a storage component that stores data associated with the producer) data that is to be included in the API response. Here, the response builder may retrieve data based on the one or more context rules (i.e., such that the API response, when generated by the response builder, includes data in accordance with the one or more context rules). As shown by reference number 135, the response builder may generate the API response to include the retrieved data.

As shown by reference number 140, the response builder may provide the API response to the consumer device. As shown, the API response may include data that corresponds to the consumer context and producer context (e.g., the data retrieved based on the one or more context rules). In this way, a context-aware API response management platform may receive an API request, identify a consumer context and a producer context based on the API request, and generate an API response based on the consumer context and the producer context. Notably, the API request, provided by the consumer device, need not include information associated with any parameters associated with generating the API response, as the intelligence of the API response generation lies on the management platform side.

As a particular example in a healthcare use case, assume that a nurse wishes to view heart monitoring data associated with a 70 year-old patient. Here, the API request, generated and provided by the consumer device, may include information that identifies the type of data request (e.g., a code corresponding to heart monitoring data), information that identifies the consumer (e.g., a username corresponding to the nurse), and information that identifies the producer (e.g., a first and last name of the patient). The request analyzer may receive the API request, and may identify (e.g., by performing a lookup using the username) the consumer context (e.g., nurse) based on the username associated with the consumer. The request analyzer may also identify (e.g., based on performing a lookup using the first and last name of the patient) the producer context (e.g., a 65-75 year age group) associated with the patient. The request analyzer may provide information associated with the consumer context, the producer context, and the information that identifies the data type to the response builder.

The response builder may determine, based on a set of stored context rules, a set of context rules that indicate an amount, a precision, and/or a granularity of heart monitoring data, associated with a patient from ages 65 to 75, that is to be provided to a nurse. Next, based on the context rules and the information that identifies the patient, the response builder may retrieve the appropriate data from data storage. The response builder may then generate the API response and provide the API response to the consumer device (e.g., such that the nurse may view the heart monitoring data associated with the 70 year old patient).

FIG. 1B is an alternative associated with the example implementation shown in FIG. 1A. For the purposes of FIG. 1B, assume that the operation of the management platform from reference numbers 155 to 175 is similar to that associated with reference numbers 105 through 125, as described above with regard to FIG. 1A.

As shown by reference number 180, the response builder may determine (e.g., using a consumer behavior model) a consumer prediction associated with the consumer. The consumer prediction may include a prediction associated with a future API request associated with the consumer. In some implementations, the response builder may determine the consumer prediction based on the information associated with the consumer and/or the consumer context. Here, the response builder may identify, based on the consumer prediction, a manner in which to modify and/or alter the API response (e.g., as would be generated based on the one or more context rules). In other words, the consumer prediction rule may indicate a manner in which the type of data, the amount of data included in the API response, the precision of the data included in the API response, the granularity of the data included in the API response, or the like, is to be added to, modified, or the like, based on the consumer prediction.

As shown by reference number 182, the response builder may determine (e.g., using a producer predictive model) a producer prediction associated with the producer. The producer prediction may include a prediction associated with a future condition, a future characteristic, a future event, or the like, associated with the producer. In some implementations, the response builder may determine the producer prediction based on the information associated with the producer and/or the producer context. Here, the response builder may identify, based on the producer prediction, a manner in which to modify and/or alter the API response (e.g., as would be generated based on the one or more context rules). In other words, the producer prediction rule may indicate a manner in which the type of data, the amount of data included in the API response, the precision of the data included in the API response, the granularity of the data included in the API response, or the like, is to be added to, modified, or the like, based on the producer prediction.

As shown by reference number 185, the response builder may retrieve (e.g., by communicating with a storage component that stores data associated with the producer) data that is to be included in the API response. Here, the response builder may retrieve data based on the one or more context rules, the consumer prediction, and the producer prediction (i.e., such that the API response, when generated by the response builder, includes data in accordance with the one or more context rules and the consumer prediction and/or the producer prediction). As shown by reference number 190, the response builder may generate the API response.

As shown by reference number 195, the response builder may provide the API response to the consumer device. As shown, the API response may include data that corresponds to the consumer context, producer context and the consumer prediction, and/or the producer prediction. In this way, a context-aware API response management platform may receive an API request, identify a consumer context and a producer context based on the API request, determine a consumer prediction and/or a producer prediction associated with the API request, and generate an API response based on the consumer context, the producer context, and the consumer prediction and/or the producer prediction.

As a particular example in the healthcare use case, assume that the response builder has determined the context rules for providing heart monitoring data, associated with a patient from ages 65 to 75, as described above with regard to FIG. 1A. Here, the response builder may generate (e.g., using a consumer behavior model) a consumer prediction associated with the nurse. For example, the consumer prediction may indicate that, after providing the consumer (e.g., the particular nurse) with data heart monitoring data for a patient from ages 65 to 75 based on the appropriate context rules, there is a 0.90 probability that the management platform will receive an API request for blood pressure data, associated with the patient, within a next five minutes. In this case, the response builder may, based on the consumer prediction, retrieve blood pressure data, associated with the patient, and include the blood pressure data in the API response.

Further, the response builder may generate (e.g., using a producer predictive model) a producer prediction associated with the patient. For example, the producer prediction may indicate that there is a 0.10 probability that the patient will experience a heart attack within a next seven days. In this case, the response builder may, based on the producer prediction, retrieve heart monitoring data with a granularity that is higher than that identified by the context rules (e.g., 500 sps rather than 200 sps), and include the data of higher granularity in the API response (e.g., such that the nurse may better inspect the heart monitoring data, call in a specialist for review, or the like). The response builder may also include a warning, a notification, information associated with the probability of a heart attack, or the like, in the API response.

As indicated above, FIGS. 1A and 1B are provided merely as an example. Other examples are possible and may differ from what was described with regard to FIGS. 1A and 1B.

Figure 2:
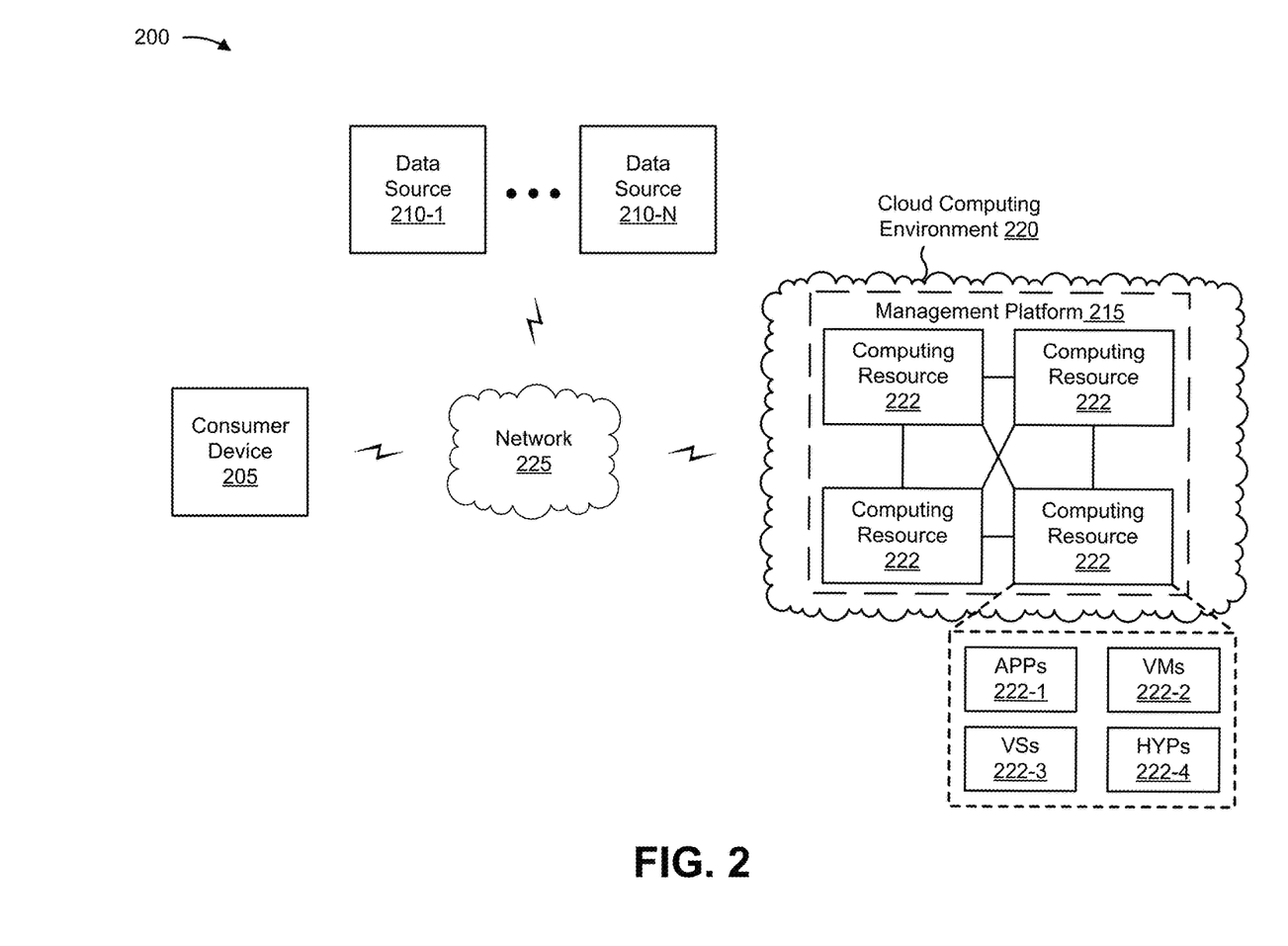
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one a consumer device 205, one or more data sources 210-1 through 210-N (N≥1) (hereinafter referred to collectively as data sources 210, and individually as data source 210), a management platform 215 hosted within a cloud computing environment 220, and a network 225. Devices of environment 200 may interconnect via wired connections, wireless connections, or a combination of wired and wireless connections.

Consumer device 205 includes one or more devices capable of generating and/or providing an API request, and receiving and/or processing an API response. For example, consumer device 205 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, a server, a group of servers, or a similar type of device.

Data source 210 includes a device capable of collecting, gathering, receiving, processing, and/or providing data associated with a producer. For example, data source 210 may include a mobile phone (e.g., a smart phone, a radiotelephone, etc.), a computing device (e.g., a desktop computer, a laptop computer, a tablet computer, a handheld computer, a camera, a digital video recorder, an audio recorder, a camcorder, etc.), an appliance (e.g., a refrigerator, a microwave, a stove, etc.), a medical device, a vehicle (e.g., an automobile, an aircraft), a light bulb, a sensor (e.g., a temperature sensor, a pressure sensor, a speed sensor), and/or another type of device. In other words, data source 210 may be any "thing" in the IoT. In some implementations, data source 210 may include a communication interface that allows data source 210 to receive information from and/or transmit information to management platform 215.

Management platform 215 includes one or more devices capable of receiving and API request, identifying a consumer context and/or a producer context based on the API request, and generating an API response based on the consumer context and/or the producer context. Additionally, or alternatively, management platform 215 may be capable of determining a consumer prediction, associated with the consumer associated with the API request, and/or a producer prediction, associated with the producer associated with the API request, and generating the API response based on the consumer prediction and/or the producer prediction. For example, management platform 215 may include a server or a group of servers.

In some implementations, management platform 215 may include a request analyzer component capable of identifying the consumer context and/or the producer context based on the API request, as described elsewhere herein. Additionally, or alternatively, management platform 215 may include a response builder component capable of generating the API response, as described elsewhere herein. Additionally, or alternatively, management platform 215 may include one or more storage components capable of storing and/or accessing context rules and/or data provided by data sources 210, as described elsewhere herein.

In some implementations, as shown, management platform 215 may be hosted in cloud computing environment 220. Notably, while implementations described herein describe management platform 215 as being hosted in cloud computing environment 220, in some implementations, management platform 215 may not be cloud-based (i.e., may be implemented outside of a cloud computing environment) or may be partially cloud-based.

Cloud computing environment 220 includes an environment that hosts management platform 215. Cloud computing environment 220 may provide computation, software, data access, storage, etc. services that do not require end-user (e.g., consumer device 205) knowledge of a physical location and configuration of system(s) and/or device(s) that hosts management platform 215. As shown, cloud computing environment 220 may include a group of computing resources 222 (referred to collectively as "computing resources 222" and individually as "computing resource 222").

Computing resource 222 may include one or more personal computers, workstation computers, server devices, or another type of computation and/or communication device. In some implementations, computing resource 222 may host management platform 215. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown in FIG. 2, computing resource 222 may include a group of cloud resources, such as one or more applications ("APPs") 222-1, one or more virtual machines ("VMs") 222-2, virtualized storage ("VSs") 222-3, one or more hypervisors ("HYPs") 222-4, or the like.

Application 222-1 may include one or more software applications that may be provided to or accessed by consumer device 205. Application 222-1 may eliminate a need to install and execute the software applications on consumer device 205. For example, application 222-1 may include software associated with management platform 215 and/or any other software capable of being provided via cloud computing environment 220. In some implementations, one application 222-1 may send/receive information to/from one or more other applications 222-1, via virtual machine 222-2.

Virtual machine 222-2 may include a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user (e.g., consumer device 205), and may manage infrastructure of cloud computing environment 220, such as data management, synchronization, or long-duration data transfers.

Virtualized storage 222-3 may include one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 may provide hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

Network 225 may include one or more wired and/or wireless networks. For example, network 225 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
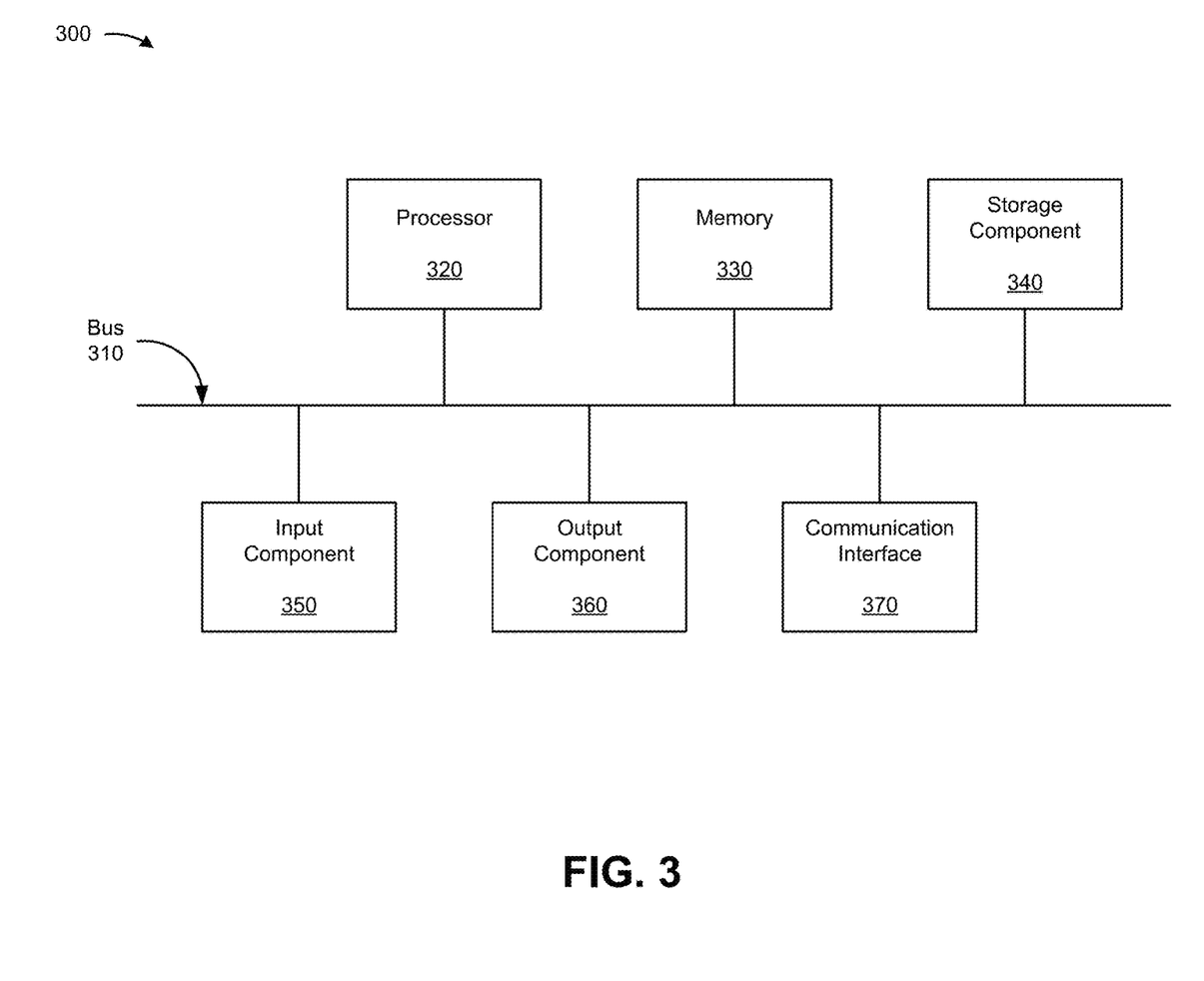
FIG. 3 is a diagram of example components of one or more devices of FIG. 2.

FIG. 3 is a diagram of example components of a device 300. Device 300 may correspond to consumer device 205, data source 210, and/or management platform 215. In some implementations, consumer device 205, data source 210, and/or management platform 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
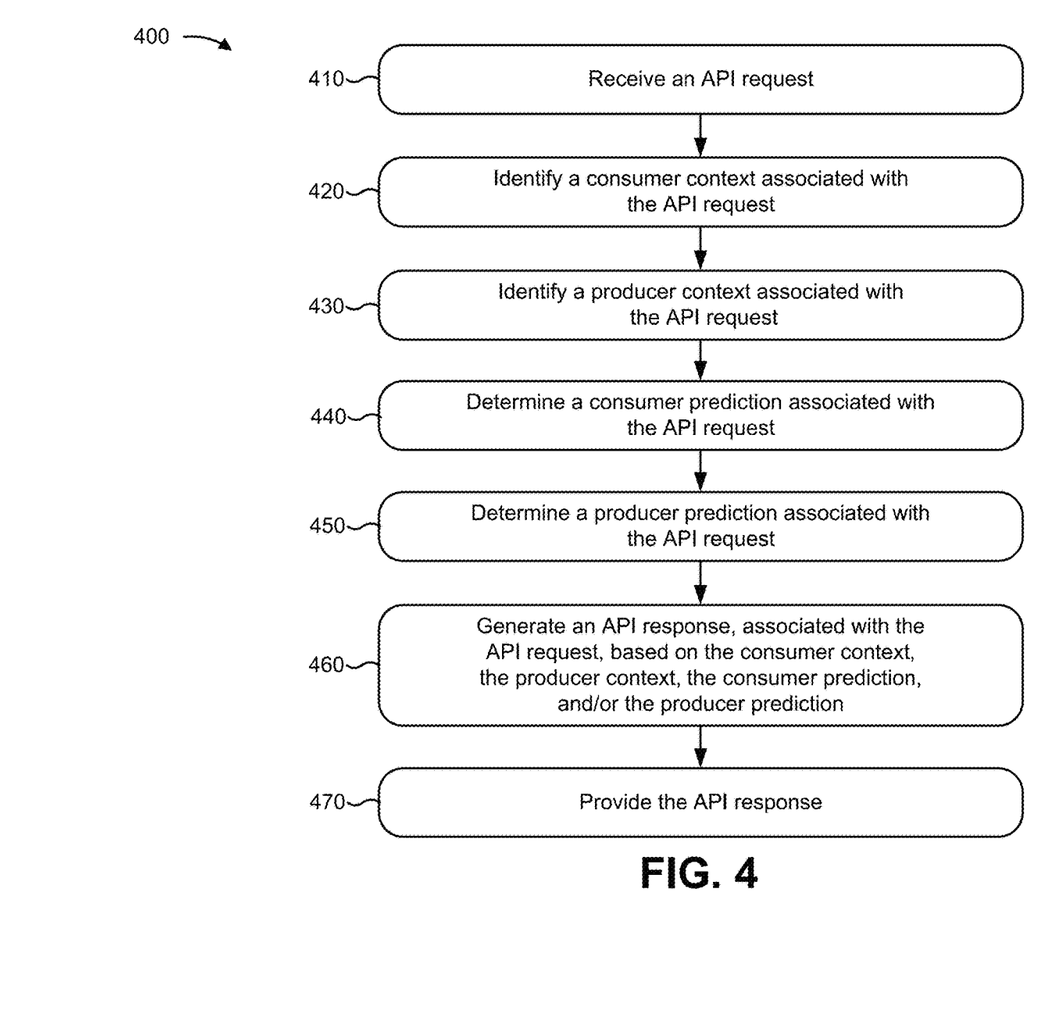
FIG. 4 is a flow chart of an example process for generating and providing an API response based on a consumer context and a producer context associated with an API request.

FIG. 4 is a flow chart of an example process 400 for generating and providing an API response based on a consumer context and a producer context associated with an API request. In some implementations, one or more process blocks of FIG. 4 may be performed by management platform 215. In some implementations, one or more process blocks of FIG. 4 may be performed by another device or a group of devices separate from or including management platform 215, such as another device of environment 200.

As shown in FIG. 4, process 400 may include receiving an API request (block 410). For example, management platform 215 may receive an API request. In some implementations, management platform 215 may receive the API request when another device provides the request, such as consumer device 205.

The API request may include a request to provide data stored or accessible via an API configured on management platform 215. In some implementations, the API request may include information that identifies a consumer of data that is to be provided based on the API request (herein referred to as a consumer identifier), information that identifies a producer of the data that is to be provided based on the API request (herein referred to as producer identifier), information that identifies a type of the data that is to be provided based on the API request (herein referred to as a data type identifier), or the like.

The consumer identifier may include information that identifies the consumer, such as a name of the consumer (e.g., a first and last name), a username, an employee identification (ID) number, or the like. Additionally, or alternatively, the consumer identifier may include information that identifies consumer device 205 to which the data is to be provided, such as a network address of consumer device 205, a device identifier of consumer device 205, information that identifies a device type of consumer device 205, information that identifies a capability of consumer device 205, or the like. Additionally, or alternatively, the consumer identifier may include combination of the above types of information or other types of identifying information relating to the consumer and/or consumer device 205.

The producer identifier may include information that identifies a person, device, entity, "thing" (in the IoT), or the like, associated with the data that is to be provided based on the API request. For example, the producer identifier may include information that identifies the producer, such as name, an ID number, a data source identifier (e.g., that identifies data source 210 associated with the data to be provided), or the like. Additionally, or alternatively, the producer identifier may include combination of the above types of information or other types of identifying information relating to the producer and/or one or more data sources 210.

The data type identifier may include information that identifies a type of data that is to be provided based on the API request. For example, the data type identifier may include information that identifies the type of data, such as a name of the data type, a data type ID number, a data structure that stores the data to be provided, or the like. Additionally, or alternatively, the data type identifier may include combination of the above types of information or other types of identifying information relating to the type of data associated with the API request.

Notably, the API request need not include particular parameters associated with the data to be provided to consumer device 205 (as with the parameterized API based approach). For example, the API request need not include information that identifies an amount of data to be provided, a granularity of the data to be provided, a precision of the data to be provided, or the like. This simplifies generation of the API request on the consumer-side (i.e., reduce consumption of computing resources) since the intelligence, associated with generating the API response, lies on the management platform 215 side (i.e., the server-side). Thus, a likelihood of incorrect and/or unwanted data being provided to consumer device 205 is reduced (e.g., by reducing a likelihood of incorrectly generated API requests). This allows for conservation of computing resources and/or network resources, as fewer API requests, with less information, may be generated and/or provided by consumer devices 205.

As further shown in FIG. 4, process 400 may include identifying a consumer context based on the API request (block 420). For example, management platform 215 may identify a consumer context based on the API request. In some implementations, management platform 215 may identify the consumer context when management platform 215 receives the API request.

The consumer context may include information that identifies a circumstance, a condition, a factor, a background, or the like, associated with the consumer, that may be used as a basis on which to generate an API response associated with the API request. For example, in some implementations, management platform 215 may use the consumer context in order to identify an amount and/or type of the data that is to be provided to consumer device 205, a precision and/or a granularity of the data that is to be provided to consumer device 205, or the like, as described below.

In some implementations, the consumer context may include information that identifies a consumer type of the consumer, such as information that identifies an occupation of the consumer, a role of the consumer, a job title of the consumer, an employee type, a classification associated with the consumer, a category associated with the consumer, an employer of the consumer, an experience level of the consumer, or the like. As a particular example, in the healthcare use case, the consumer context may identify the consumer as a nurse, a doctor, a specialist, or the like. As another particular example, in an agricultural use case, the consumer context may identify the consumer as an agro-agent, a farmer, an equipment supplier, or the like. As yet another particular example, in an automotive use case, the consumer context may identify the consumer as a sales executive, an automobile owner, an insurance agent, or the like.

In some implementations, management platform 215 may identify the consumer context based on the consumer identifier included in the API request. For example, management platform 215 may store or have access to information (e.g., a data structure) that identifies a consumer context that corresponds to the consumer identifier included in the API request. Here, management platform 215 may search the data structure using the consumer identifier, and may identify the consumer context based on a result of the search that identifies a consumer context corresponding to the consumer identifier. As a particular example, assume that management platform 215 receives an API request that includes an employee ID number, and that management platform 215 stores or has access to a data structure that identifies consumer contexts corresponding to various employee ID numbers. Here, management platform 215 searches the data structure for the employee ID number in order to identify a consumer context (e.g., a job title) assigned to the employee ID number. In some implementations, management platform 215 may identify a default consumer context (e.g., when management platform 215 does not store or have access to information that identifies a consumer context corresponding to the consumer identifier).

Additionally, or alternatively, management platform 215 may identify the consumer context based other information included in the API request. For example, in some implementations, the API request may include information (e.g., a string of characters, such as consumer job title code) associated with the consumer context. Here, management platform 215 may identify the consumer context based on the information associated with the consumer context (e.g., when management platform 215 stores or has access to information associating the consumer job title code to a particular job title).

As further shown in FIG. 4, process 400 may include identifying a producer context based on the API request (block 430). For example, management platform 215 may identify a producer context based on the API request. In some implementations, management platform 215 may identify the producer context when management platform 215 receives the API request. Additionally, or alternatively, management platform 215 may identify the producer context when (e.g., before, after, concurrently with) management platform 215 identifies the consumer context.

The producer context may include information that identifies a type, a group, a class, a condition, a factor, a background, or the like, associated with the producer, that may be used as a basis on which to generate the API response associated with the API request. For example, in some implementations, management platform 215 may use the producer context in order to identify an amount and/or type of data that is to be provided to consumer device 205, a precision and/or a granularity of the data that is to be provided to consumer device 205, or the like, as described below. In some implementations, management platform 215 may use both the producer context and the consumer context as a basis on which the API response is generated, as described below.

In some implementations, the producer context may include information that identifies a producer type of the producer, such as information that identifies a category associated with the producer, a classification associated with the producer, a group to which the producer belongs, a characteristic associated with the producer, or the like. As a particular example, in the healthcare use case, the producer context may identify the producer as an elite athlete, a cardiac patient, a senior citizen, an age and/or age group of the patient, a gender of the patient, or the like. As another particular example, in the agricultural use case, the producer context may identify the producer as a type of crop (e.g., corn, soybeans), as being located in a particular environment (e.g., humid, temperate, rainy), as being located in a particular geographic location (e.g., a county, a state, a country), or the like. As yet another particular example, in the automotive use case, the producer context may identify the producer as a particular make, model and/or year of automobile, a particular type of automobile (e.g., a car, a truck, a sport-utility vehicle), as being associated with a particular automobile manufacturer and/or dealer, as being associated with a particular engine type (e.g., gasoline, diesel, four-cylinder, six-cylinder), or the like.

In some implementations, management platform 215 may identify the producer context based on the producer identifier included in the API request. For example, management platform 215 may store or have access to information (e.g., a data structure) that identifies a producer context that corresponds to the producer identifier included in the API request. Here, management platform 215 may search the data structure using the producer identifier, and may identify the producer context based on a result of the search that identifies a producer context corresponding to the producer identifier. As a particular example, assume that management platform 215 receives an API request that includes a patient ID number, and that management platform 215 stores or has access to a data structure that identifies producer contexts corresponding to various patient ID numbers. Here, management platform 215 search the data structure for the patient ID number in order to identify a producer context corresponding to the patient ID number. For example, the producer context may identify the producer as a 20 year-old elite athlete, as a 70 year-old patient with a history of cardiac arrest, or the like. In some implementations, management platform 215 may identify a default producer context (e.g., when management platform 215 does not store or have access to information that identifies a producer context corresponding to the producer identifier).

As further shown in FIG. 4, process 400 may include determining a consumer prediction associated with the API request (block 440). For example, management platform 215 may determine a consumer prediction associated with the API request. In some implementations, management platform 215 may determine the consumer prediction after management platform 215 receives the API request. Additionally, or alternatively, management platform 215 may determine the consumer prediction after management platform 215 identifies the consumer context and/or the producer context.

The consumer prediction may include a prediction associated with a future API request (sometimes referred to as a future request) associated with the consumer. For example, the consumer prediction may include a prediction that management platform 215 will receive (e.g., within a threshold amount of time, such as 15 seconds, 1 minute, 5 minutes), another API request, associated with the consumer, after management platform 215 provides an API response associated with the API request.

As a particular example, assume that management platform 215 receives a first API request, associated with a consumer, indicating that data of a first type is to be provided to consumer device 205. Here, the consumer prediction may include a prediction that, after providing a first API response to consumer device 205, management platform 215 will receive, from consumer device 205 (e.g., within a 30 second time window), a second API request, associated with the consumer, indicating that a second (i.e., different) type of data is to be provided to consumer device 205. As an alternative example, the consumer prediction may include a prediction that, the second API request, associated with the consumer, will indicate that data of the same type, but of a higher granularity (e.g., as compared to data provided based on the first API request) is to be provided to the consumer device 205. In some implementations, management platform 215 may generate the API response based on the consumer prediction, as described below.

As another example, the prediction may be associated with a series of future API requests, such as a predication associated with API requests that management platform 215 may receive at a same time each day, based on a recurring event, or the like.

As still another example, the predication may be associated with multiple consumer devices 205, such as a prediction that management platform 215 will receive a second API request (e.g., for a different type of data, for data with a different granularity) from a second consumer device 205 after (e.g., immediately, within a time window) receiving a first API request from a first consumer device 205.

As yet another example, the prediction may be associated with one or more data sources 210, such as a prediction that management platform 215 will receive a second API request relating to a second, different data source 210 after receiving a first API request relating to a first data source 210.

In some implementations, management platform 215 may generate the consumer prediction based on a consumer behavior model that is accessible by management platform 215. The consumer behavior model may be a model capable of generating the consumer prediction based on information associated with the API request, the consumer, and/or the consumer context. For example, management platform 215 may provide, as input to the consumer behavior model, information associated with the API request, and may receive, as output from the consumer behavior model, the consumer prediction.

As a particular example, management platform 215 may provide the consumer identifier and information that identifies the type of data (e.g., a first type of data) associated with the API request (e.g., a first API request) as input to the consumer behavior model. Here, the consumer behavior model may determine a likelihood (e.g., a probability, a score) that management platform 215 will receive another API request, associated with the consumer and a second type of data, within a next one minute after receiving the API request associated with the consumer and the first type of data. Here, the consumer behavior model may output a consumer prediction indicating that management platform 215 is likely to receive a second API request, associated with the consumer and the second type of data, when, for example, the likelihood satisfies a threshold (e.g., a probability threshold, a scoring threshold). For example, if the likelihood indicates that there is a 0.80 probability that management platform 215 will receive the second API request within the next one minute, and the probability threshold is 0.65, then the consumer behavior model may output a prediction that management platform 215 will receive the second API request. In some implementations, the consumer behavior model may also provide, to management platform 215, information that identifies the likelihood associated with the consumer prediction. Additionally, or alternatively, the consumer behavior model may predict that management platform 215 will not receive a second API request (e.g., when the likelihood does not satisfy the threshold).

As another example, management platform 215 may provide, as input to the consumer behavior model, information associated with the consumer context, and may receive as output from the consumer behavior model, the consumer prediction. As a particular example, management platform 215 may provide information, such as information that identifies an employee type of the consumer and information that identifies an experience level of the consumer, as input to the consumer behavior model. Here, the consumer behavior model may determine a likelihood that management platform 215 will receive another API request, associated with the consumer, within a next one minute after receiving the API request associated with the employee type of the consumer and the information that identifies the experience level. Here, the consumer behavior model may output a consumer prediction indicating that management platform 215 is likely to receive a second API request, associated with the consumer, when, for example, the likelihood satisfies a threshold.

As yet another example, management platform 215 may provide, as input to the consumer behavior model, a combination of information included in the API request and information associated with the consumer context, may determine a likelihood that management platform 215 will receive a second API request, and may receive, as output from the consumer behavior model, the consumer prediction based on the determined likelihood.

In some implementations, management platform 215 may train and/or update the consumer behavior model based on receiving API requests. For example, management platform 215 may train and/or update the consumer behavior model based on a sequence of API requests received by management platform 215 (e.g., such that the consumer behavior model is repeatedly updated based on API requests received by management platform 215).

As further shown in FIG. 4, process 400 may include determining a producer prediction associated with the API request (block 450). For example, management platform 215 may determine a producer prediction associated with the API request. In some implementations, management platform 215 may determine the producer prediction after management platform 215 receives the API request. Additionally, or alternatively, management platform 215 may determine the producer prediction after management platform 215 identifies the consumer context and/or the producer context.

The producer prediction may include a prediction associated with a future condition, characteristic, event, or the like, associated with the producer. For example, the producer prediction may include a prediction that the producer will reach a condition, exhibit a particular characteristic, experience a particular event, or the like, within a future time window (e.g., a next one hour, a next seven days, a next one month).

As a particular example, in the healthcare use case, the producer prediction may be a prediction that a patient (i.e., a producer) will experience a health related event (e.g., a heart attack, a deterioration in condition) within a future time period (e.g., a next 10 minutes, a next 24 hours, a next one month). As another particular example, in the agricultural use case, the producer prediction may be a prediction that a crop will experience a low yield (e.g., as compared to an expected yield) for an upcoming harvest. As another particular example, in the automotive use case, the producer prediction may be that a particular automobile will experience a breakdown and/or failure within a future time period.

In some implementations, management platform 215 may generate the producer prediction based on a producer predictive model that is accessible by management platform 215. The producer predictive model may be a model capable of generating the producer prediction based on data associated with the producer (e.g., stored or accessible by management platform 215) and/or the producer context. For example, management platform 215 may provide data, associated with the producer, as input to the producer predictive model, and may receive the producer prediction as an output of the producer predictive model.

In some implementations, the producer predictive model may generate producer prediction based on data, associated with the producer, corresponding to a particular time window. For example, in the healthcare use case, management platform 215 may identify, based on the API request, a patient associated with the API request. Here, management platform 215 may provide heart monitoring data, associated with the identified patient and corresponding to a most recent 24 hour time period, as input to the producer predictive model. The producer predictive model may determine, based on the heart monitoring data, a likelihood (e.g., a probability, a score) that the patient will experience a heart failure within a next 48 hours.

Here, the producer predictive model may output a producer prediction indicating that the patient will is likely to experience to a heart failure when, for example, the likelihood of the event satisfies a threshold (e.g., a probability threshold, a scoring threshold). For example, if the output indicates that there is a 0.08 probability that the patient will experience a heart failure within the next 48 hours, and the probability threshold is 0.05, then the producer predictive model may output the prediction. In some implementations, the producer predictive model may also provide, to management platform 215, information that identifies the likelihood associated with the producer prediction. Additionally, or alternatively, the producer predictive model may predict that the patient will not experience a heart failure (e.g., when the likelihood does not satisfy the threshold).

Additionally, or alternatively, the producer predictive model may generate the producer prediction based on the producer context. For example, in the automotive use case, management platform 215 may identify, based on the API request, a particular make, model, and year of an automobile that is associated with the API request. Here, management platform 215 may provide information that identifies the make, model, and the year as input to the producer predictive model. The producer predictive model may determine, based on inputting information associated with the make, model, and year of the automobile, a likelihood that the automobile will experience an engine failure within a future time window (e.g., a next one month).

Here, the producer predictive model may output a producer prediction indicating that the automobile is likely to experience to an engine failure when, for example, the likelihood of the event satisfies a threshold. Additionally, or alternatively, the producer predictive model may predict that the automobile will not experience an engine failure (e.g., when the likelihood does not satisfy the threshold). Additionally, or alternatively, the producer predictive model may generate the producer prediction based on a combination of data associated with the producer and information associated with the producer context (i.e., the producer predictive model may receive data, associated with the producer, and information associated with the producer context as input, and may generate the producer prediction as output).

In some implementations, management platform 215 may train and/or update the producer predictive model based on receiving additional data from data sources 210. For example, management platform 215 may train and/or update the producer predictive model based on additional data, associated with the producer and/or the producer context, received by management platform 215 from one or more data sources 210.

As further shown in FIG. 4, process 400 may include generating an API response, associated with the API request, based on the consumer context, the producer context, the consumer prediction, and/or the producer prediction (block 460). For example, management platform 215 may generate an API response, associated with the API request, based on the consumer context, the producer context, the consumer prediction, and/or the producer prediction. In some implementations, management platform 215 may generate the API response after management platform 215 identifies the consumer context and/or the producer context. Additionally, or alternatively, management platform 215 may generate the API response after management platform 215 determines the consumer prediction and/or the producer prediction.

In some implementations, management platform 215 may generate the API response based on a context rule associated with the consumer context and the producer context. The context rule may include a rule, corresponding to the consumer context and/or the producer context, that indicates an amount of data to be included in the API response, a precision of the data to be included in the API response, a granularity of the data to be included in the API response, or the like.

In some implementations, the context rule may be associated with the consumer context. For example, a first context rule may indicate that the API response should include data with a first granularity (e.g., heart monitoring data with 200 sps) for a first consumer context (e.g., a nurse), while a second context rule may indicate that the API response should include data with a second granularity (e.g., heart monitoring data with 500 sps) for a second consumer context (e.g., a specialist). In some implementations, the context rule may be associated with one or more items of information associated with the consumer context. For example, a third context rule may correspond to consumers with a particular job title and first experience level, while a fourth context rule may correspond to consumers with the particular job title and a second experience level.

Additionally, or alternatively, the context rule may be associated with the producer context. For example, a first context rule may indicate that the API response should include data with the first granularity (e.g., heart monitoring data with 200 sps) for a first producer context (e.g., when the producer as an elite athlete), while a second context rule may indicate that the API should include data with the second granularity for a second producer context (e.g., when the producer has a history of cardiac arrest). In some implementations, when two or more context rules (e.g., a context rule identified based on the consumer context, a context rule identified based on the producer context) provide conflicting information associated with generating the API response, management platform 215 may select one or more context rules of the two or more conflicting rules by, for example, selecting the context rule that causes management platform 215 to generate an API response that includes the most data, the most precise data, the most granular data, or the like. In some implementations, the context rule may be associated with one or more items of information associated with the producer context. For example, a third context rule may correspond to producers within a particular category (e.g., elite athletes) within a first group (e.g., less than or equal to 30 years of age), while a fourth context rule may correspond to producers within the particular category and within a second group (e.g., more than 30 years of age).

Additionally, or alternatively, the context rule may be associated with both the consumer context and the producer context. For example, a first context rule may indicate that the API response should include data corresponding to a first time period (e.g., a most recent 24 hours) when the consumer context is a first consumer context (e.g., nurse) and the producer context is a first producer context (e.g., elite athlete). Continuing with this example, a second context rule may indicate that the API response should include data corresponding to a second time period (e.g., a most recent 48 hours) when the consumer context is the first consumer context and the producer context is a second producer context (e.g., patient with history of cardiac arrest). Similarly, a third context rule may indicate that the API response should include data corresponding to a third time period (e.g., a most recent 72 hours) when the consumer context is a second consumer context (e.g., specialist) and the producer context is the first producer context. In other words, different context rules may correspond to different combinations of consumer contexts and/or producer contexts. In some implementations, the context rule may be associated with one or more items of information associated with the producer context and one or more items of information associated with the consumer context.

In some implementations, management platform 215 may identify one or more context rules, associated with generating the API response, based on the consumer context and/or the producer context. For example, management platform 215 may have access to information associated with a set of context rules. Here, management platform 215 may search the information associated with the set of context rules using the information associated with the consumer context and/or the producer context in order to identify one or more applicable context rules based on which to generate the API response. Here, after identifying the one or more applicable context rules, management platform 215 may retrieve (e.g., from storage of management platform 215) data in accordance with the one or more applicable context rules, and may generate the API response such that the API response includes the data as identified by the one or more applicable context rules. In some implementations, management platform 215 may generate the API response based on a default context rule (e.g., when no context rule exists for the consumer context and/or the producer context).

Additionally, or alternatively, management platform 215 may generate the API response based on the consumer prediction. For example, management platform 215 may store of have access to a consumer prediction rule, corresponding to the consumer prediction, that indicates a manner in which to modify and/or alter the API response (e.g., as generated based on one or more context rules). In other words, the consumer prediction rule may indicate a manner in which the type of data, the amount of data included in the API response, the precision of the data included in the API response, the granularity of the data included in the API response, or the like, is to be added to, modified, or the like, based on the consumer prediction.

As an example, assume that management platform 215 receives an API request, indicating that management platform 215 is to provide data of a first type to consumer device 205, and determines a consumer prediction indicating that management platform 215 will receive a second API request, indicating that management platform 215 is to provide data of a second type to consumer device 205 (e.g., within a future time window after providing an API response). Here, management platform 215 may, based on the consumer prediction, identify a consumer prediction rule indicating that management platform 215 is to add the data of the second type to the API response, and provide the API response such that the API response includes both the data of the first type and the data of the second type. As an alternative example, the consumer prediction rule may indicate that management platform 215 is to include a hyperlink, associated with the data of the second type, in the API response (e.g., such that consumer device 205 may access the data of the second type based on a user interaction with the hyperlink). Additionally, or alternatively, management platform 215 may generate the API response based on a default consumer prediction rule (e.g., when no consumer prediction rule exists for the consumer prediction).

Additionally, or alternatively, management platform 215 may generate the API response based on the producer prediction. For example, management platform 215 may store of have access to a producer prediction rule, corresponding to the producer prediction, that indicates a manner in which to modify and/or alter the API response (e.g., as generated based on one or more context rules). In other words, the producer prediction rule may indicate a manner in which the type of data, the amount of data included in the API response, the precision of the data included in the API response, the granularity of the data included in the API response, or the like, is to be added to, modified, or the like, based on the producer prediction.

As an example, assume that management platform 215 receives an API request, and determines, based on context rule associated with a consumer context and/or a producer context identified based on the API response, that management platform 215 is to provide data with a first granularity to consumer device 205. Further, assume that management platform 215 determines a producer prediction indicating that the producer, associated with the API request, will experience an event (e.g., a cardiac event, a low crop yield, an engine breakdown) within a future time window. Here, management platform 215 may, based on the producer prediction, identify a producer prediction rule indicating that management platform 215 is include additional data in the API response (e.g., increase the granularity of the data by one level, increase the granularity of the data to a particular level) provided to consumer device 205. Additionally, or alternatively, management platform 215 may generate the API response based on a default producer prediction rule (e.g., when no producer prediction rule exists for the producer prediction).

Additionally, or alternatively, management platform 215 may modify the API response to include information associated with the producer prediction (e.g., such that consumer device 205 may provide, for display, the information associated with the producer prediction to the consumer).

In some implementations, as described above, management platform 215 may generate the API response based on retrieving and/or obtaining data, to be included in the API response, from a storage component of management platform 215. Management platform 215 may then generate the API response such that the API response includes the data retrieved and/or obtained by management platform 215.

Notably, the above uses of the consumer context, the producer context, the consumer prediction, and the producer prediction are provided as examples. In other words, in some implementations, management platform 215 may generate the API response based any combination of one or more items of information associated with the consumer context, one or more items of information associated with the producer context, the consumer prediction, and/or the producer prediction.

In some implementations, management platform 215 may generate the API response based on a manual override indicated in the API request. For example, the API request may include information indicating that the consumer wishes to specify the type of data, the amount of the data, the precision of the data, and/or the granularity of the data (e.g., rather than allowing management platform 215 to generate the API response based on the consumer context, the producer context, the consumer prediction, and/or the producer prediction). In such a case, management platform 215 may generate an API response that includes information (e.g., a list of parameters) from which the consumer may identify the manner in which management platform 215 generates the API response. Here, consumer device 205 may provide, based on consumer input, information that identifies the manner in which management platform 215 is to generate the response, and management platform 215 may generate the API response accordingly.

As further shown in FIG. 4, process 400 may include providing the API response (block 470). For example, management platform 215 may provide the API response. In some implementations, management platform 215 may provide the API response after management platform 215 generates the API response. Additionally, or alternatively, management platform 215 may provide the API response when management platform 215 receives an indication that management platform 215 is to provide the API response from another device and/or component, such as another device and/or component of environment 200.

In some implementations, management platform 215 may provide the API response to consumer device 205. For example, management platform 215 may provide the API response to consumer device 205 in order to cause consumer device 205 to receive the API response, and provide the data and/or other information, included in the API response, for display to the consumer.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may provide a context-aware API response management platform capable of receiving an API request, identifying a consumer context and a producer context based on the API request, and generating an API response based on the consumer context and the producer context. In this way, the burden of API orchestration may lie on the server-side (e.g., rather than the consumer-side), thereby reducing a likelihood of incorrect and/or undesired data being provided to the consumer device. The context-aware API response management platform also conserves computing resources (e.g., processing resources, memory resources) and/or network resources needed to provide desired data to the consumer device by, for example, reducing a number of API requests and responses that need to be generated, transferred, and/or processed.

In some implementations, the context-aware API response management platform may be capable of generating a consumer prediction, associated with the API request, and/or a producer prediction, associated with the API request, and generating the API response based on the consumer prediction and/or the producer prediction (e.g., in addition to the consumer context and the producer context). This allows for further conservation of resources, as such predictions may allow the management platform to provide data to the consumer device without a need for the consumer device to provide an API request to the management platform.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive, from a consumer device, an application programming interface (API) request,
the API request including information associated with a consumer of data and information associated with a producer of the data,
the data being collected by one or more data sources associated with the producer;
identify a consumer context, associated with the consumer, based on the information associated with the consumer;
identify a producer context, associated with the producer, based on the information associated with the producer;
identify one or more context rules that correspond to one or more of the consumer context or the producer context,
a context rule, of the one or more context rules, indicating one or more of a precision or a granularity of the data included in an API response;
determine a producer prediction associated with the API request,
the producer prediction including a prediction associated with the producer experiencing a particular event;
generate the API response based on the consumer context, the producer context, and the one or more context rules,
the API response including data in accordance with the consumer context and the producer context;
modify the API response based on the producer prediction,
the modified API response generated by increasing the precision or the granularity of the data indicated by the context rule; and
provide, to the consumer device, the modified API response to permit the consumer to view or access the data.

2. The device of claim 1, where the one or more processors are further to:
generate a consumer prediction, associated with the consumer, based on the information associated with the consumer or the consumer context, the consumer prediction including a prediction associated with a future API request associated with the consumer; and where the one or more processors, when generating the API response, are to:
generate the API response based on the consumer prediction.

3. The device of claim 2, where the one or more processors, when generating the consumer prediction, are to:
provide the information associated with the consumer of the data as an input to a consumer behavior model; and
determine the consumer prediction based on an output of the consumer behavior model.

4. The device of claim 1, where the one or more processors are further to:
provide information associated with the producer prediction.

5. The device of claim 1, the one or more processors further to:
determine a consumer prediction,
the consumer prediction including a prediction of receiving a second API request within a set period of time.

6. The device of claim 1, were the one or more processors to determine the producer prediction associated with the request are to:
determine a probability associated with the producer experiencing the particular event within a set period of time.

7. The device of claim 1, were the one or more processors to receive the API request are to:
receive one or more of a consumer identifier or a producer identifier,
the consumer identifier to include one or more of:
a name of the consumer,
a username, or
an employee identifier, and
the producer identifier to include one or more of:
an identification number, or
a data source identifier.

8. A non-transitory computer-readable medium storing instructions, the instructions comprising:
one or more instructions that, when executed by one or more processors, cause the one or more processors to:
receive, from a consumer device, an application programming interface (API) request that includes information associated with a consumer of data and information associated with a producer of the data, the data being collected by one or more data sources associated with the producer;
identify, based on the information associated with the consumer, a consumer context associated with the consumer;
identify, based on the information associated with the producer, a producer context associated with the producer;
determine a producer prediction associated with the API request,
the producer prediction including a prediction associated with the producer experiencing a particular event;
determine a set of context rules based on the consumer context or the producer context,
a context rule, of the set of context rules, indicating one of more of a precision or a granularity of the data included in an API response;
generate an API response based on the set of context rules,
the API response including data in accordance with the set of context rules;
modify the API response based on the producer prediction,
the modified API response generated by increasing the precision or the granularity of the data indicated by the context rule; and
provide the modified API response to the consumer device to permit the consumer to view the data included in the API response.

9. The non-transitory computer-readable medium of claim 8, where the one or more instructions, when executed by the one or more processors, further cause the one or more processors to:
generate a consumer prediction, associated with the consumer, based on the information associated with the consumer or the consumer context,
the consumer prediction including a prediction associated with a future API request associated with the consumer; and
where the one or more instructions, that cause the one or more processors to generate the API response, cause the one or more processors to:
generate the API response further based on the consumer prediction.

10. The non-transitory computer-readable medium of claim 8, where the one or more instructions, that cause the one or more processors to generate the producer prediction, cause the one or more processors to:
provide the information associated with the producer of the data as an input to a producer predictive model; and
determine the producer prediction based on an output of the producer predictive model.

11. The non-transitory computer-readable medium of claim 8, where the one or more instructions, when executed by the one or more processors, further cause the one or more processors to:
provide information associated with the producer prediction.

12. The non-transitory computer-readable medium of claim 8, where the one or more instructions, when executed by the one or more processors, further cause the one or more processors to:
determine a consumer prediction,
the consumer prediction including a prediction of receiving a second API request within a set period of time.

13. The non-transitory computer-readable medium of claim 8, where the one or more instructions, that cause the one or more processors to determine the producer prediction associated with the request, cause the one or more processors to:
determine a probability associated with the producer experiencing the particular event within a set period of time.

14. The non-transitory computer-readable medium of claim 8, where the one or more instructions, that cause the one or more processors to receive the API, cause the one or more processors to:
receive one or more of a consumer identifier or a producer identifier,
the consumer identifier to include one or more of:
a name of the consumer,
a username, or
an employee identifier, and the producer identifier to include one or more of:
an identification number, or
a data source identifier.

15. A method, comprising:

receiving, by a management platform, a request that includes information that identifies a consumer of data and information that identifies a producer of the data,
the data being collected by a set of sensors and being accessible by the management platform, and
the request being provided by a consumer device associated with the consumer;

identifying, by the management platform and based on the information that identifies the producer, a producer context associated with the producer;

identifying, by the management platform, one or more context rules that correspond to the producer context,
a context rule, of the one or more context rules, indicating one or more of a precision or a granularity of the data included in an API response;

determining, by the management platform, a producer prediction associated with the request,
the producer prediction including a prediction associated with the producer experiencing a particular event;

generating, by the management platform, a response to the request,
the response being generated based on the producer context and the one or more context rules and
the response including data in accordance with the producer context;

modifying, by the management platform, the response based on the producer prediction,
the modified response generated by increasing the precision or the granularity of the data indicated by the context rule; and providing, by the management platform and to the consumer device, the modified response,
the modified response being provided to permit the consumer to view or access the data included in the response.

16. The method of claim 15, further comprising:

identifying, based on the information that identifies the consumer, a consumer context associated with the consumer; and where generating the response comprises:
generating the response based on the consumer context.

17. The method of claim 15, further comprising:

generating a consumer prediction, associated with the consumer, based on the information that identifies the consumer or consumer context,
the consumer prediction including a prediction associated with a future request associated with the consumer; and where generating the response comprises:
generating the response based on the consumer prediction.

18. The method of claim 15, further comprising:

determining a consumer prediction associated with the consumer,
the consumer prediction including a prediction associated with a future request associated with the consumer;

where the producer prediction is associated with the producer,
the producer prediction including a prediction associated with a future condition, a future characteristic, or a future event associated with the producer; and where generating the response comprises:
generating the response based on the consumer prediction and the producer prediction.

19. The method of claim 15, where determining the producer prediction associated with the request comprises:

determining a probability associated with the producer experiencing the particular event within a set period of time.

20. The method of claim 15, where receiving the API comprises:

receiving one or more of a consumer identifier or a producer identifier,
the consumer identifier to include one or more of:
a name of the consumer,
a username, or
an employee identifier, and
the producer identifier to include one or more of:
an identification number, or
a data source identifier.

* * * * *